(No Model.)
W. MORITZ.
RATCHET DRILL.
No. 292,345. Patented Jan. 22, 1884.
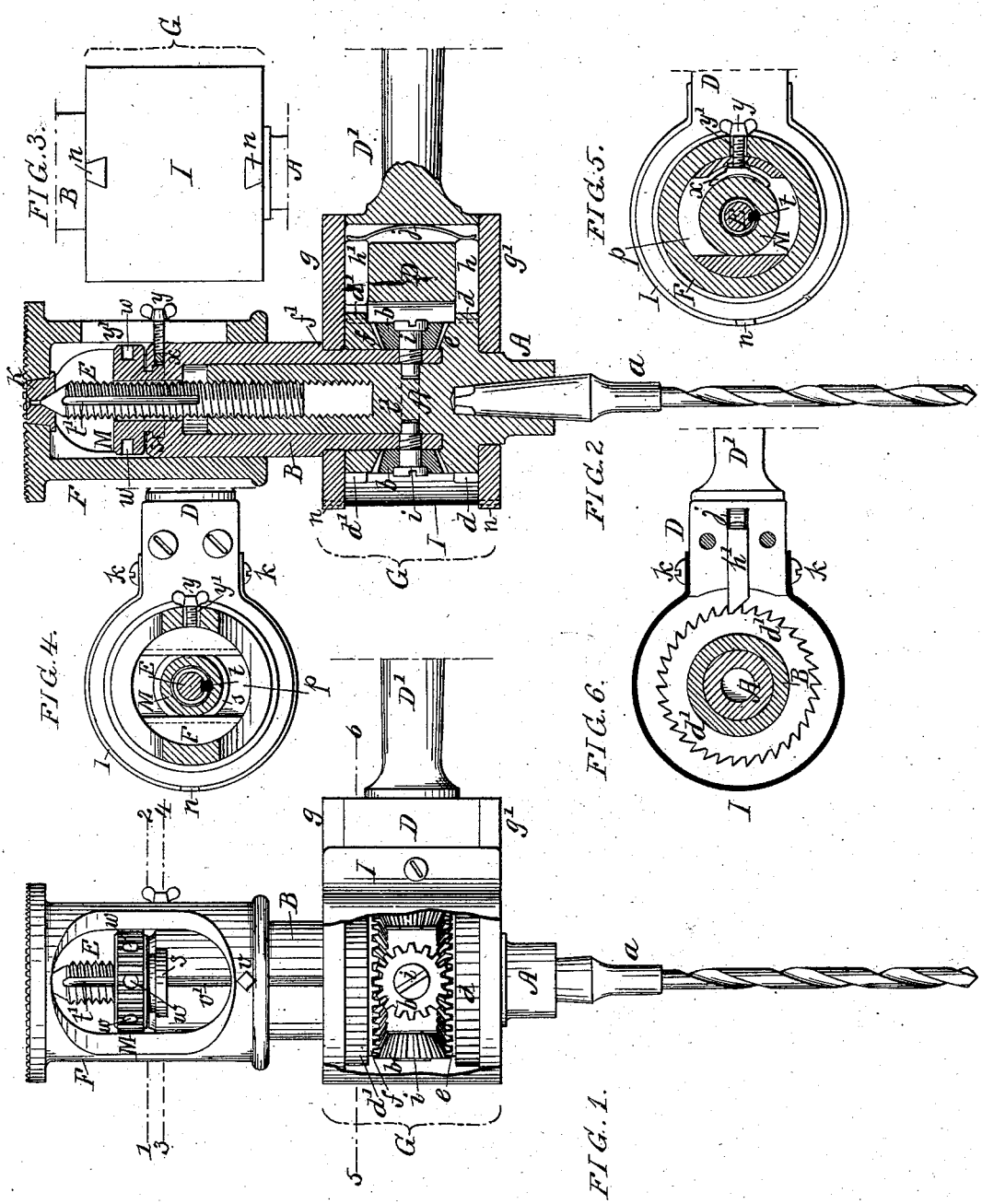
WITNESSES:
John E. Parker
Harry L. Ashenfelter.
INVENTOR:
William Moritz
by his attorneys
Howson & Sons

UNITED STATES PATENT OFFICE.

WILLIAM MORITZ, OF PHILADELPHIA, PENNSYLVANIA.

RATCHET-DRILL.

SPECIFICATION forming part of Letters Patent No. 292,345, dated January 22, 1884.

Application filed August 13, 1883. (No model.)

*To all whom it may concern:*

Be it known that I, WILLIAM MORITZ, a subject of the Emperor of Germany, and a resident of Philadelphia, Pennsylvania, have invented certain Improvements in Ratchet-Drills, of which the following is a specification.

The objects of my invention are to construct compact driving mechanism for the drill-spindle, to permit either the continuous or intermittent turning of the latter by the vibration of the operating-arm, and to provide an automatic feed for the drill.

In the accompanying drawings, Figure 1 is a side view, partly in section, of my improved ratchet-drill; Fig. 2, a vertical section of the same; Fig. 3, a face view of part of the drill; Fig. 4, a sectional plan on the line 1 2, Fig. 1; Fig. 5, a sectional plan on the line 3 4, Fig. 1; and Fig. 6, a sectional plan on the line 5 6, Fig. 1.

The drill $a$ is secured in a socket in the lower end of the drill-spindle A, the latter having a bearing in a sleeve, B, over which is fitted a cap, F, adapted to form the rear bearing of the drill, the outer face of said cap being roughened to prevent the turning of the same. The cap carries a plug, K, of steel or hardened iron, forming a bearing for the outer conical end of the feed-screw E, which passes through an opening in the sleeve B, and is adapted to a threaded opening in the spindle A. Screw-pins $i$ (four in the present instance) are carried by the sleeve B, the inner ends of these pins being adapted to an annular groove, $i'$, in the spindle A, so as to prevent longitudinal separation of the sleeve and spindle, the latter, however, being free to turn independently of the sleeve. The pins $i$ carry bevel-pinions $b$, which serve to gear together a bevel-wheel, $e$, forming part of the spindle A, and a bevel-wheel, $f$, adapted to turn loosely on the sleeve B, right-handed ratchet-teeth $d$ being formed on the periphery of the wheel $e$ and left-handed teeth $d'$ on the periphery of the wheel $f$.

G is the pawl-carrying frame, which comprises a block, D, with handle D', and the upper and lower plates, $g$ $g'$, bolted to the block, the lower plate, $g'$, having a bearing on the spindle A, and the upper plate, $g$, a bearing between the wheel $f$ and a shoulder, $f'$, on the sleeve B. Pawls $h$ $h'$ are guided in radial slots in the block D, the pawl $h$ being right-handed, and adapted to the teeth of the ratchet-wheel $d$, and the pawl $h'$ being left-handed for adaptation to the teeth of the ratchet-wheel $d'$, both pawls being acted upon by a spring, $j$, which is contained in a vertical slot in the block D. It will thus be seen that when the handle D' is moved to the right there will be a direct forward movement of the drill-spindle, due to the action of the pawl $h$ on the ratchet-wheel $d$, the pawl $h'$ trailing on the wheel $d'$, and on the backward movement of the handle the pawl $h'$ actuates the wheel $d'$, the pawl $h$ trailing on the wheel $d$, but a forward movement being imparted to the spindle A through the medium of the bevel-wheels $e f$ and pinions $b$.

A casing, I, secured to the frame G, serves to cover the driving-gear of the drill and prevent the access of dust and dirt thereto, this casing being secured to the block D by screws $k$, and having in each edge a dovetailed recess for the reception of dovetailed lugs $n$ on the plates $g$ $g'$, so that it tends to prevent the spreading of said plates.

In the upper end of the sleeve B is a transverse slot, $p$, the opposite edges of which are undercut for the reception of a flange, $s$, on a ring, M, a feather, $t$, in which is adapted to a slot, $t'$, in the feed-screw E, so that the latter must turn with the ring M, but does not prevent longitudinal movement of the same with the sleeve B, the latter being prevented from turning by means of a set-screw, $v$, on the cap F, the point of said screw being adapted to a slot, $v'$, in the sleeve B. The periphery of the ring M is milled, and has a series of openings, $w$, for the reception of a pin, so that the ring can be readily held by hand in order to stop the rotation of the screw E and effect the feeding of the drill. I however prefer to provide the drill with an automatic feeding device consisting of an elastic plate, $x$, bearing on the flange $s$ of the ring M, and acted upon by a set-screw, $y$, carried by the sleeve B and adapted to a vertical slot, $y'$, in the cap F. By adjusting this screw the friction of the plate $x$ on the flange $s$ can be regulated as desired, and as long as this friction is less than that exerted on the drill (as it will be when the drill is cutting) the ring will turn with the screw, and there will be no forward feed of the drill; but as soon as the friction on the drill is less than that on the ring—that is to say, when the drill loses its bite on the work—the said ring will be held, the screw E will be prevented from turning, the drill-spindle being consequently fed forward until the drill again commences to cut.

When it is desired to operate the drill on the forward movement only of the handle D', the screws $v$ and $y$ are removed, so that the sleeve B is free to turn, the sleeve and its pinions $b$ in this case turning with the wheel $f$ on the backward movement of the handle, and failing to exercise any control over the wheel $e$.

I claim as my invention—

1. The combination of the drill-spindle having a groove, $i'$, and bevel-wheel $e$, the loose bevel-wheel $f$, the pinions $b$, and the sleeve B, having pins $i$, adapted to the groove $i'$, and carrying the pinions $b$, as set forth.

2. The combination of the drill-spindle and driving-gear therefor, as described, with a pawl-carrying frame, G, comprising the block D, plates $g\ g'$, and casing I, as set forth.

3. The combination of the drill-spindle and means for rotating the same, the sleeve B, longitudinally confined to said spindle, the cap F, circumferentially confined to the sleeve, the feed-screw E, and the ring M, connected to the feed-screw so as to turn therewith, and longitudinally confined to the sleeve B, as set forth.

4. The combination of the drill-spindle A, the sleeve B, means for preventing the latter from turning with the spindle, the feed-screw E, and the ring M, turning with the screw confined longitudinally to the sleeve and held thereto circumferentially by a friction-clamp, as set forth.

5. The combination of the drill-spindle A, the sleeve B, having a slot, $v'$, the feed-screw E, ring M, and the cap F, having a set-screw, $v$, adapted to the slot $v'$, as set forth.

6. The combination of the drill-spindle A, the sleeve B, the feed-screw E, and the cap F, having a bearing-plug, K, as set forth.

In testimony whereof I have signed my name to this specification in the presence of two subscribing witnesses.

WILLIAM MORITZ.

Witnesses:
JOHN E. PARKER,
HARRY SMITH.